United States Patent [19]

Hess et al.

[11] Patent Number: 4,829,382
[45] Date of Patent: May 9, 1989

[54] AUTOMATIC APERTURE CONTROL OF A TELEVISION CAMERA

[75] Inventors: Andreas Hess, Weiterstadt; Jurgen Klink, Otzberg; Friedrich Zimmermann, Rossdorf, all of Fed. Rep. of Germany

[73] Assignee: BTS Broadcast Television Systems GmbH, Darmstadt, Fed. Rep. of Germany

[21] Appl. No.: 131,816

[22] Filed: Dec. 11, 1987

[30] Foreign Application Priority Data

Dec. 22, 1986 [DE] Fed. Rep. of Germany ....... 3643870

[51] Int. Cl.$^4$ .................... H04N 5/232; H04N 5/235
[52] U.S. Cl. .............................. 358/228; 358/213.13; 358/162; 358/41
[58] Field of Search ................ 358/41, 228, 225, 220, 358/211, 162, 213.13

[56] References Cited

U.S. PATENT DOCUMENTS 4,409,620 10/1983 Enomoto ............................ 358/228
4,532,550 7/1985 Bendell ............................... 358/228
4,542,403 9/1985 Zimmermann ...................... 358/228

Primary Examiner—Tommy P. Chin
Attorney, Agent, or Firm—Frishauf, Holtz Goodman & Woodward

[57] ABSTRACT

R, G and B outputs from the corresponding preamplifiers of a television camera are supplied to a non-additive mixer (NAM) circuit for continuous selection of the greatest of the three outputs and the selected output is continuously supplied to a set of 9 electronic switches each selecting out a subdivision of the picture field (a, b ... i). The switched outputs for each of the subfields are then provided to respective subfield measurement detectors which each produce an average value output and a peak value output. These are stored into subfield buffer units and then read out through a multiplexer and an analog to digital converter to a microprocessor. The various values are compared with corresponding past values for selecting between various measurement schemes for obtaining a camera diaphragm control signal, namely spot measurement, center-emphasized integral measurement and selective field measurement. Except when a decision for no setting change is made, the selected scheme of measurement is used to obtain a control signal from the average and dynamic range values of the several subfield video signals.

18 Claims, 2 Drawing Sheets

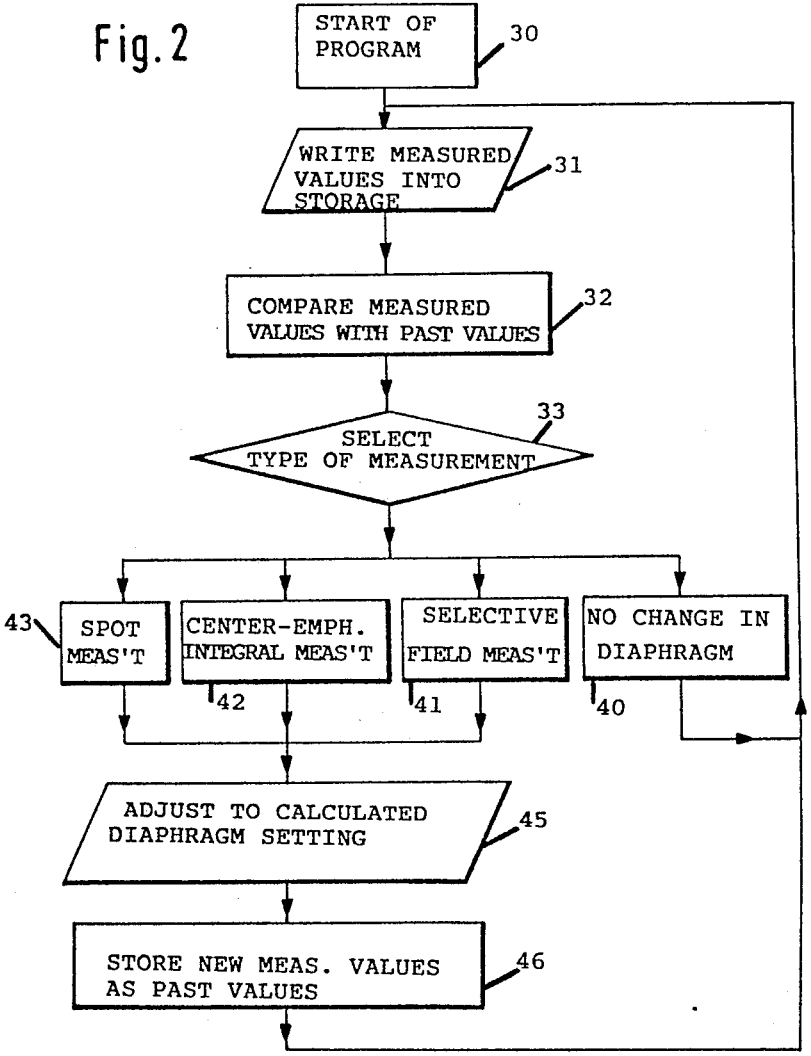

4,829,382

AUTOMATIC APERTURE CONTROL OF A TELEVISION CAMERA

This invention concerns a method and apparatus for automatically controlling the exposure to light in a television camera by means of a control voltage derived from the video signals produced in the camera. The control voltage adjusts the diaphragm by which the camera aperture is varied. Heretofore control voltage for automatically adjusting the diaphragm aperture of a television camera was derived from the video signals by measuring their peak values or average values. The result often was that bright subjects in front of dark backgrounds were overexposed and that dark subjects in front of a bright background lost so much detail as to be unrecognizable.

For avoidance of these disadvantages it is now already known to extract, from the full picture field video signals, the signals of a predetermined section of the picture, a method hereinafter referred to as "spot measurement". The luminance signals were then obtained from the color component video signals of the extracted picture section after which only these luminance signals were utilized for producing control magnitude signals for the camera aperature control device.

In practice, however, it can happen that the boundary of such a selective picture section can be surrounded by a very bright background which will contribute to the control of the aperature and thereby necessarily lead to underexposure. Optimal aperture regulation was therefore obtained when only the video signal corresponding to the subject of interest was measured and no local change of the subject took place.

Further improvement of automatic control later became known which introduced multiple measuring and weighting. In general the middle portion of the picture field was accorded the heavier weighting in the formation of the control voltage in processing after the measurement while the two outer edge portions to the left and right and, sometimes, an upper edge portion, also contributed to a smaller degree. This method, hereinafter referred to as the so called "center-emphasized integral measurement", is based on the consideration that the main subject is in most cases located in the middle of the picture and that in the upper portion of the picture there is, as a rule, no important subject (e.g. only sky). Great aperture changes occur, however, when bright subjects move into or out of the part of the picture which is more heavily emphasized for exposure. In both of these known measurement methods, spot measurement as well as center-emphasized integral measurement, each of the measurement values is compared with a previously set reference value and the aperture adjustment is then changed just enough to bring the actual aperture setting to the reference value.

There is also known, from U.S. Pat. No. 4,409,620, an automatic exposure control for a television camera in which the video signals of a complete picture field is subdivided into a number of partial picture picture fields by time division. The video signals of a particular partial picture field can then be selectively obtained and utilized for derivation of the setting voltage for aperture control. This known system has the disadvantage, however, that the camera operator must himself select and switch in the desired partial picture field for exposure control. In addition this system merely subdivided the picture field by television lines into adjoining horizontal picture strips, so that unimportant picture elements could still contribute to provide inadequate exposure control.

SUMMARY OF THE INVENTION

It is an object of the invention to provide a method and apparatus for automatic television camera aperture control by which optimal exposure control is possible especially when there are contrasty subjects and strong highlights or bright spots in the picture.

Briefly, video signals corresponding to several partial picture fields are separated from each other at vertical as well as horizontal boundaries and individually measured. The several measured values are then weighted and compared with predetermined reference values for deriving the control voltage. In particular the video signals of the individual partial picture fields are measured with reference to both amplitude and to dynamic range. For amplitude an average value measurement is made and for dynamic range the ratio of the peak value to the average value of the video signal is determined.

Preferably at the beginning of camera operation center-emphasized integral measurement is used for aperture control and thereafter a repeated evaluation of the measurement values serves also for selection of a criterion for deriving the control voltage from the measurement value evaluations.

There are further important aspects of the invention to be mentioned, but they are best explained with reference to an illustrated description.

BRIEF DESCRIPTION OF THE DRAWINGS

The invention is now further described by way of illustrative example with reference to the annexed drawings, in which:

FIG. 2 is a flow diagram illustrating the performance of the method of the invention and the operation of the apparatus of FIG. 1, especially that of the microprocessor therein.

DESCRIPTION OF THE ILLUSTRATED METHOD AND EMBODIMENT

Figures 1, 1A:
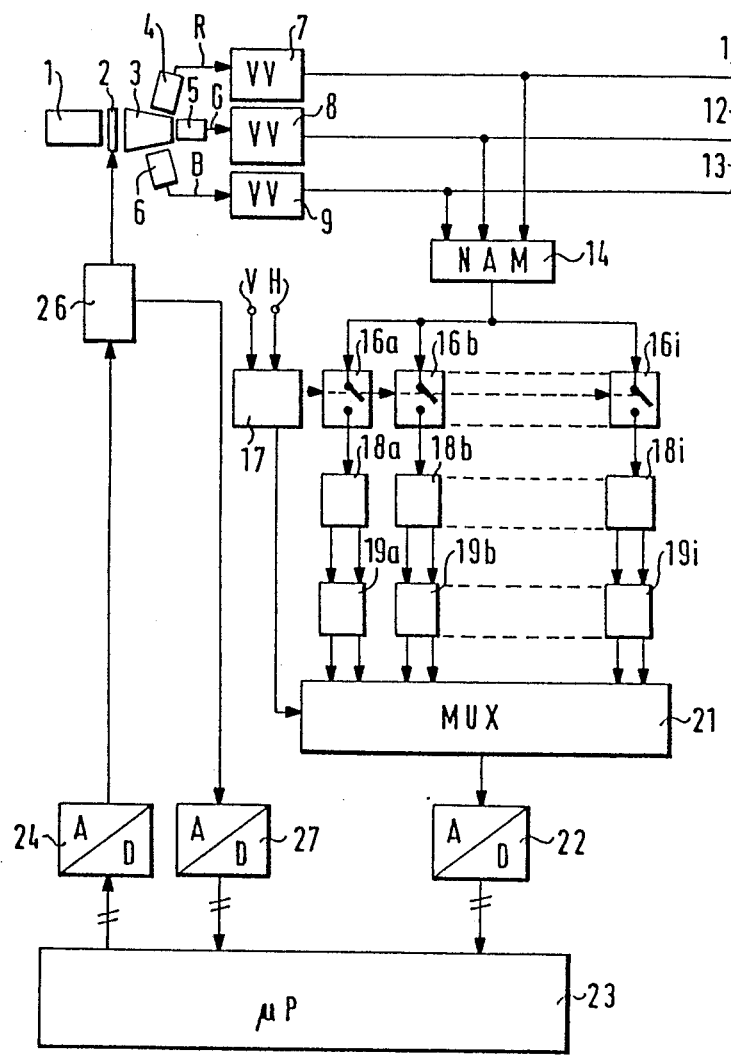
FIG. 1 is a circuit block diagram for carrying out the method of the invention.
FIG. 1a is a diagram of subdivision of the overall picture field into contiguous partial picture fields.

FIG. 1 shows the circuit block diagram of a preferred example of carrying out the method and providing the equipment for automatic aperture adjustment in a television camera. The light exposure and pick-up portion of the TV camera comprises an objective lens 1, and iris diaphragm 2 and a light beam splitter 3 which splits the light rays into respective beams of color values R, G and B, to which the optoelectrical converters 4, 5 and 6 are optically coupled. These optoelectric converters may be pick-up tubes or semiconductor sensor devices, for example. Preamplifiers 7, 8 and 9 are connected to the respective signal outputs of the optoelectrical converters 4, 5 and 6 and provide output signals to the output terminals 11, 12 and 13 for further processing.

For carrying out the method of the invention the outputs of the preamplifiers 7, 8 and 9 are also respectively connected to the inputs of a non-additive mixer circuit 14, in which there is selected whichever of the 3 output values is the greatest at the particular time, this selected color component signal then being used for deriving the positioning voltage for diaphragm aperture control. The output of the non-additive mixer (NAM)

circuit 14 is, in this example, connected to the inputs of 9 electronic switches 16a to 16i respectively corresponding to 9 contiguous partial picture fields a, b, c . . . i which fit together to make up a complete picture field as shown in FIG. 1a.

In FIG. 1a the overall picture field is subdivided, for this example, into 9 equally large rectangular fields a, b . . . i which are each regularly evaluated separately, so that from them all one or more will be chosen for deriving the positioning voltage. The switches 16a to 16i are controlled by a pulse generator 17 which is synchronized by the vertical and horizontal synchronizing pulses of the television signal. Thus, for example, when the switch 16a closes, the highest signal values of the first line in the partial picture field a are passed through, after which the switch 16a opens and the switch 16b closes and then the highest values of the first line of partial picture field b are transmitted. Similarly after opening of the switch 16b and closing of the switch 16c the highest values of the first line of the partial picture field c are transmitted, and so on. The outputs of the switches 16a through 16i are respectively connected to the subfield measuring detectors 18a through 18i, in which, in each case, both the peak value and the average value of the transmitted signal values are measured.

The subfield measuring detectors 18a through 18i accordingly each have two outputs respectively serving for providing the peak value and the average value. After measurement of these two values for each partial picture field the measured values are intermediately stored in buffer storage units 19a through 19i, from which they are sequentially supplied through a multiplexer 21 to an analog to digital converter 22. The multiplexer 21 is put through its paces by the pulse generator 17. These measurement values are then digitalized by means of the analog to digital converter 22 and supplied to the data inputs of a microprocessor 23.

The derivation of the positioning voltage for aperture control takes place in the microprocessor 23 in accordance with an algorithm provided therein, whereby each value of position signal is produced out of the measured values of the individual partial picture fields after corresponding evaluation such as comparison with a reference value. The positioning signal is made available by the microprocessor 23 as digital signal appearing at its outputs which are connected to a digital to analog converter 24. An analog control voltage is then supplied by the converter 24 to a servo device 26 for adjusting the iris diaphragm 2. The servo device 26 also includes means making available a signal voltage serving as the fed back report of the present actual value of the aperture setting, which is digitalized in an analog to digital converter 27 and supplied to other inputs of the microprocessor 23. The microprocessor thus provides the signal comparison function of the servo system in which the device 26 operates.

For the evaluation and further processing of the measured values in the microprocessor 23 both the measured amplitude and the dynamic range are important in each partial picture field. As already mentioned above, the two measured values which are supplied to the microprocessor 23 from each partial picture field a, b . . . i in the illustrated example are, more particularly, the average value and the peak value. Since the amplitude corresponds to the average value and the dynamic range is well represented by the ratio of peak value to average value, the automatic aperture control according to the invention can effectively be carried out with these two measured values.

The evaluations of amplitude and dynamic range for each partial picture field are used also for selection among different processing procedures for the signal data. At the beginning of the control operation, thus, for example shortly before the switching on of the television camera, it is useful for the picture to be evaluated to have a certain basic brightness which then should be set in the camera by the diaphragm. In order to obtain this the measured data, written into the microprocessor 23, are at first evaluated by "center-emphasized integral measurement". Since most of the information important for the picture is to be found in the mid-portion, the four partial picture fields a, c, g and i which lie in the picture corners are not evaluated at this time and the partial picture fields b, d, e, f and h are weighted with different weights. Thus the field b has, for example a weight of 4, the field d a weight of 12, the field e a weight of 37, the field f a weight of 12 and the field h a weight of 26. These weights correspond to the percentage contributions of the subfields when all are used together. The fields a, c, g and i then only contribute 19% all together, in this example. The weighted average value obtained with these "weight" factors is then further compared with a prescribed reference value for optimal light value. A positioning magnitude is derived from this comparison and the result is converted into the positioning voltage which serves as a reference voltage for adjusting the diaphragm aperture.

After a successful establishment of a certain basic brightness, such that the generated video signals lie in the amplitude range of the optoelectrical converters, the video signals of all of the partial picture fields are evaluated. At this point the previously prevailing amplitude (average value) as well as the detected dynamic range of the individual partial picture fields are respectively compared with an elimination criterion which represents a minimum dynamic range value for the partial picture field. If that elimination criterion is fulfilled, i.e. if the field in question contains mainly a monochromatic surfaces or surfaces poor in contrast, the partial field is eliminated from further consideration. The partial field would usually also be eliminated even when it exhibits a certain dynamic range if there is also an excessively small average value (as may be found when bright spots occur). A reference value for comparison with actual value of the diaphragm setting is then derived from the measurement data of the fields still remaining under consideration, and the aperture control voltage is then developed from the comparison.

The foregoing evaluation of the measurement data of all partial picture fields with elimination of unimportant partial picture fields is referred to in the rest of this description as "selective field measurement". In this measurement the three fields with the currently greatest integrated or averaged value may be drawn upon for computation. In each field a comparison value is then obtained and the corresponding aperture change calculated therefrom. The calculated changes are then equally distributed over the various fields.

Besides the measurement types known as "center-emphasized integral measurement" and "selective field measurement" the so called "spot measurement" can also be brought into play for the setting of the diaphragm. For this purpose only one partial picture field, in the middle of the picture (i.e. the field e in FIG. 1a), is evaluated and the determination of the aperture change by a comparison with a reference value, or with a value derived from the dynamic range prevailing in this field, takes place.

The overall course of aperture control will now be explained with reference to the flow diagram shown in FIG. 2. After the start of the program, the preliminary step 30 in FIG. 2, all of the measurement values obtained are read into the storage portion of the microprocessor 23 as a first step 31. These values are then compared with the previous or past values in a second step 32, from which it is decided (third step 33) what type of measurement should be brought into play for optimal aperture control. Thus a "center-emphasized integral measurement" step 42 is always selected, apart from the case of the beginning of the camera operation, when the integral or average value has changed by more than one aperture stop interval in more than three partial picture fields (subfields). If the integral or average value in the middle partial picture field e is greater than 85% of maximum, then the so called "spot measurement" step 43 is used. If the integral or average value has changed from its past value in more than two partial picture fields by more than one quarter of a diaphragm stop interval, the so-called selective field measurement step 41 is carried out. If no changes of the measurement values from past values have resulted, no diaphragm change needs to be carried out (return step 40), and in this case the microprocessor proceeds with the next measurement operation, introduced by the reading in of new measurement values. After the carrying out of each one of the different kinds of measurement (41, 42 or 43), by which the positioning magnitude for the setting of the calculated diaphragm setting has been derived and used to set the diaphragm (step 45), the values measurement of the individual partial picture fields are stored (step 46) in the microprocessor 23 as so called "past values". The next measurement in control operation can then be performed in a manner taking account of these "past values".

The magnitudes of aperture changes necessary to compensate for differences in brightness of scenes are commonly referred to in connection with camera diaphragm settings as "one stop", "two stops", "half a stop" or the like, in terms of the usual iris diaphragm scales marks identifying successive "stop" values. What is meant, of course, by a "one stop" change is a change over "one stop interval" on the usual scale.

Although the invention has been described with reference to a particular illustrative example, it will be understood that modifications and variations are possible within the inventive concept.

We claim:

1. Method of automatic aperture control for a TV camera having an electrically controllable aperture-control diaphragm and having also video signal outputs respectively for three color component television signals and means for producing from at least one of said video signal outputs a data stream of selected video signals constituting video signals of a succession of complete television picture fields, comprising the steps of:

subdiving said selected video signals of each television picture field, by time division switching sychronized to said video signals, into a plurality of partial television picture fields to produce a corresponding plurality of subfield video signals each providing video signals of a succession of complete picture subfields;

making at least one measurement of the video signals of each said complete picture subfield;

providing at least one stored reference video signal value for each of said partial television picture fields corresponding to a said succession subfield video signals;

comparing each said video signal measurement with a corresponding one of said stored reference video signals values to provide subfield video signal evaluation video signal values and deriving, from said subfield video signal evaluation video signal values, a control voltage for controlling said aperture-control diaphragm.

2. Method as defined in claim 1, wherein two said video signal measurements are made of the video signals of each said complete picture subfields, namely an amplitude measurement and a dynamic range measurement, and wherein two corresponding stored reference video signal values, namely a reference amplitude value and a reference dynamic range value, are provided for each of said partial television picture fields corresponding to a said succession of complete subfield video signals.

3. Method as defined in claim 2, wherein said video signal amplitude measurements are performed by averaging video signals and said dynamic range measurements are performed by obtaining the ratio of video signal peak value to video signal average value.

4. Method as defined in claim 2, wherein the step of deriving control voltage for controlling said aperture-control diaphragm from said subfield video signal evaluation values includes the step of weighting said subfield video signal evaluation values respectively with predetermined weighting factors respectively assigned to said partial television picture fields.

5. Method as defined in claim 4, wherein during an initial period of use of said television camera the derivation from said subfield video signal evaluation values of a control voltage for controlling said aperture-control diaphragm is performed by center-emphasized integral measurement and thereafter a further step is performed of deriving from said subfield video signal evaluation values a selection of a processing criterion selected from among a plurality of processing criteria for deriving said control voltage from said subfield video signal evaluation values.

6. Method as defined in claim 5, where the step of deriving from said subfield video signal evaluation values a selection of a processing criterion selected from among a plurality of processing criteria includes the selection of said center-emphasized integral measurement as said selected processing criterion for deriving from said subfield of video signal values said control voltage for said aperture control diaphragm whenever said subfield video signal average values change by more than one diaphragm stop interval in more than one third of the total number of said partial television picture fields.

7. Method as defined in claim 5, wherein the step of deriving from said subfield video field evaluation values a selection of a processing criterion from among a plurality of processing criteria includes selecting mid-region spot measurement as said selected processing criterion for deriving said control voltage for controlling said aperture control diaphragm form said subfield video signal evaluation values whenever, in a said partial television picture field which is centrally located, a video signal average value is measured which is more than 85% of a video signal average value which is a maximum average value possible for said subfield video signal average value of said centrally located partial television picture field.

8. Method as defined in claim 5, wherein said step of deriving from said subfield video signal evaluation values a selection of a processing criterion selected from among a plurality of processing criteria includes selection of a selective field measurement criterion for deriving said control voltage for controlling said aperture-control diaphragm whenever respective subfield video signal average values in a predetermined number of said partial television picture fields constituting more than one-fifth of a complete television picture filed change by more than one-quarter of diaphragm stop interval, said selective field measurement criterion depending upon determining which said number of said partial television picture fields respectively have higher subfield video signal average values than the subfield video signal average values of the respective partial television picture fields which are not among said number of determined partial television picture fields, followed by deriving said control voltage for controlling said aperture-control diaghragm from said subfield video signal evaluation values of said number of determined partial television picture fields.

9. Method as defined in claim 8, wherein prior to the derivation of a control voltage for controlling said aperture-control diaphragm from said subfield video signal evaluation values, the field signal evaluation values corresponding to subfields in which the dynamic range measurements are less than a reference value corresponding to a minimum value of dynamic range are eliminated from the derivation of said control voltage for said aperture control diaphragm.

10. Method as defined in claim 9, wherein said control voltage for controlling said aperture control diaphragm is used as a reference voltage for comparison with a voltage representing the currently existing position of said diaphragm in a servo system for setting said diaphragm and wherein said control voltage derived from said subfield video signal evaluation values is derived in a manner dependent upon the dynamic range measurements respectively made for each of those partial television picture fields which have not theretofore been eliminated from the derivation of said control voltage.

11. Method as defined in claim 5, wherein the step of comparing each said video signal measurement with a corresponding said reference video signal value and the step of deriving a control voltage for controlling said aperture control diaphragm from said subfield video signal evaluation values are performed in a microprocessor provided with a program embodying an algorithm for performance of said steps.

12. Method as defined in claim 1, wherein prior to the subdivision of said selected video signals of each television picture field, there is performed, by said means for producing a data stream from at least one of said outputs respectively for three color component television signals, the non-additive mixing of said three color component television signals, for continuously selecting from said three color component television signals the one of the three which is greatest, and for thereby producing said data stream of selected video signals constituting video signals of said succession of complete television picture fields.

13. Apparatus for controlling an automatically settable aperture control of a TV camera diaphragm in response to video signals produced in the camera, said camera having R, G and B color component video outputs, said apparatus comprising:

means for deriving from said color component video outputs a single data stream of video signals representing a succession of complete picture fields;

means for time-division subdivision of said single data stream for subdividing the video signals thereof representing each complete picture field into several separate video signal sequences respectively representing different picture subfields each of which is a part of a said complete picture field;

means for performing an amplitude measurement and a dynamic range measurement of each of said separate video sequences for each said subfield represented by a said sequence;

means for storage of said measurements until corresponding measurements for the subfields of the next complete picture field are available for storage, said storage means having outputs for making said measurements available for further processing;

means connected to said outputs of said storage means for reading out said measurements sequentially from said storage means through outputs of said readout means in a manner distinguishing the several measurements from each other in each sequence relating to a complete picture field;

timing means, connected for receiving sychronization signals sychronizing said timing means to said data stream of video signals and also connected for timing at least said data stream subdivision means, said storage means and said reading out means;

means for producing an electrical signal representing the actual setting of said camera diaphragm and for making said electrical signals available at an output said signal producing means;

microprocessor means connected to said signal producing means for receiving said diaphragm actual setting signal and having data inputs connected to said outputs of said reading out means, for comparing said respective measurements with reference magnitude respectively related to the several subfields and said amplitude and dynamic range measurements, and for comparing said respective measurements with corresponding measurements previously made and also for deriving from said comparisons a first electrical control signal representing a desired aperture setting and for comparing said first electrical control signal with said signal representing the actual setting of said camera diaphragm to produce a second electrical control signal, and means for utilizing said second electrical control signal to actuate said automatically settable camera diaphragm.

14. Apparatus as defined in claim 13, wherein said video signals of said data stream are analog video signals and wherein an analog to digital converter is interposed between said reading out means and said microprocessor means.

15. Apparatus as defined in claim 14, wherein a second analog to digital converter is provided at said input of said microprocessor means for receiving said actual diaphragm setting signal, for converting said actual diaphragm setting signal to digital form, and wherein a digital to analog converter is interposed between an output of said microprocessor means and an input of said utilizing means for supplying thereto said second electrical control signals, said digital to analog converter thereby serving for converting said second electrical control signal to analog form.

16. Apparatus as defined in claim 13, wherein said means for deriving from said color component video outputs a single data stream of video signals representing a succession of complete picture fields include nonadditive mixer means for continuously selecting, from among said color component video outputs of said camera, the output of which the video signals of greatest magnitude appear, for utilization of the selected output as the source of signals for said single data stream, by supplying to said data stream subdivision means the single data stream of video signals thus obtained.

17. Apparatus as defined in claim 16, wherein said video signals of said data stream are analog video signals and wherein an analog to digital converter is interposed between said reading out means and said microprocessor means.

18. Apparatus as defined in claim 16, wherein a second analog to digital converter is provided at said input of said microprocessor means for receiving said actual diaphragm setting signal, for converting same to digital form, and wherein a digital to analog converter is interposed between an output of said microprocessor means and an input of said means for supplying thereto said second electrical control signals, said digital to analog converter thereby serving for converting said second electrical control signal to analog form.

* * * * *